United States Patent
Sakai

(10) Patent No.: US 7,233,993 B2
(45) Date of Patent: Jun. 19, 2007

(54) INFORMATION PROCESSING APPARATUS, DISTRIBUTED PRINTING CONTROLLING METHOD, PROGRAM FOR CAUSING INFORMATION PROCESSING APPARATUS TO EXECUTE DISTRIBUTED PRINTING CONTROLLING METHOD, AND COMPUTER-READABLE RECORDING MEDIUM STORING PROGRAM

(75) Inventor: Masahiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 10/867,503

(22) Filed: Jun. 14, 2004

(65) Prior Publication Data

US 2005/0024673 A1 Feb. 3, 2005

(30) Foreign Application Priority Data

Jun. 30, 2003 (JP) ............................. 2003-187458

(51) Int. Cl.
*G06F 15/16* (2006.01)
(52) U.S. Cl. ..................................... 709/226
(58) Field of Classification Search ................ 709/226, 709/201
See application file for complete search history.

(56) References Cited

U.S. PATENT DOCUMENTS

| | | | | |
|---|---|---|---|---|
| 5,245,678 A * | 9/1993 | Eschbach et al. ........... 382/252 |
| 5,287,434 A * | 2/1994 | Bain et al. .............. 235/462.15 |
| 5,625,757 A * | 4/1997 | Kageyama et al. ........ 358/1.14 |
| 5,633,932 A * | 5/1997 | Davis et al. ................. 713/176 |
| 5,819,014 A * | 10/1998 | Cyr et al. ................... 358/1.15 |
| 5,940,186 A * | 8/1999 | Barry et al. ................ 358/296 |
| 6,301,011 B1 * | 10/2001 | Fung et al. ................ 358/1.15 |
| 6,631,009 B1 * | 10/2003 | Thomas et al. ............ 358/1.15 |
| 6,650,433 B1 * | 11/2003 | Keane et al. .............. 358/1.15 |
| 6,941,865 B2 * | 9/2005 | Kato .......................... 101/484 |
| 6,965,444 B1 * | 11/2005 | Shimada et al. ........... 358/1.15 |
| 6,967,728 B1 * | 11/2005 | Vidyanand ................. 358/1.12 |
| 6,976,798 B2 * | 12/2005 | Keane et al. ................. 400/76 |
| 7,061,635 B1 * | 6/2006 | Wanda et al. .............. 358/1.15 |
| 2002/0030851 A1 | 3/2002 | Wanda |

FOREIGN PATENT DOCUMENTS

JP 2002-163086 A 6/2002

* cited by examiner

*Primary Examiner*—David Y. Eng

(57) ABSTRACT

In a distributed printing system in which an original print job is divided into a plurality of distributed print jobs that are printed on a plurality of output devices, in order to stop outputting the pages subsequent to a predetermined page in the original print job, an instruction for outputting up to the predetermined page is inputted. It is determined which of the output devices outputs the distributed print job that includes the predetermined page. Based on this determination, an instruction to stop outputting the pages subsequent to the predetermined page is issued to the output device that outputs the distributed print job that includes the predetermined page.

9 Claims, 12 Drawing Sheets

FIG. 7
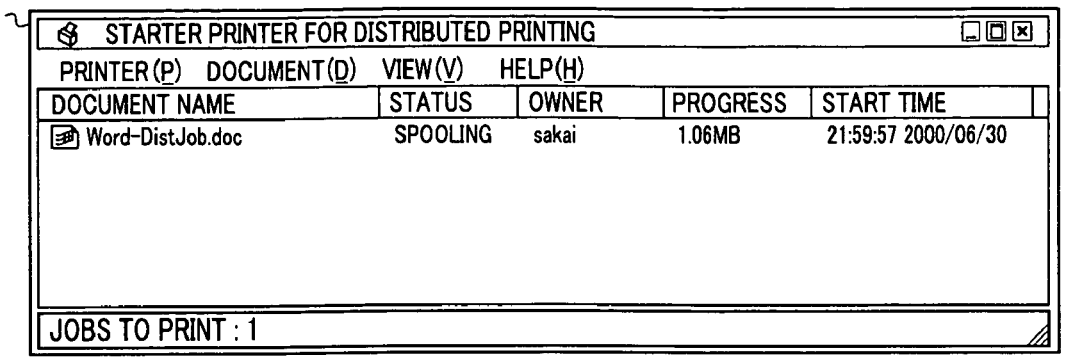
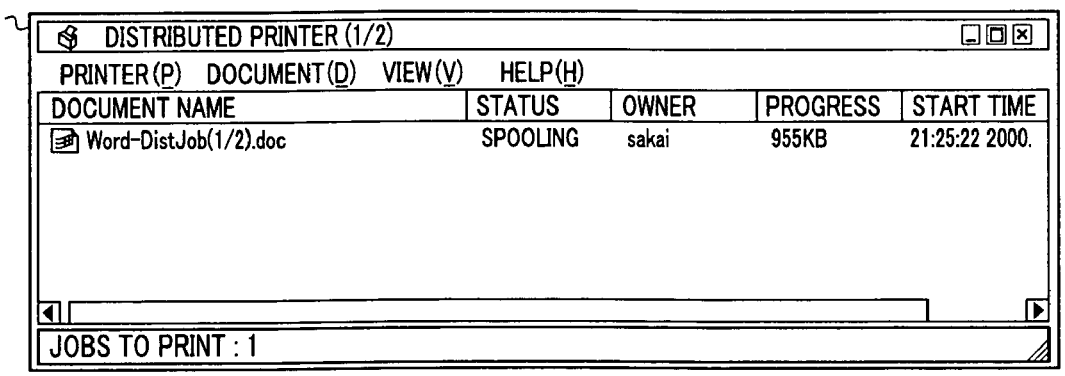
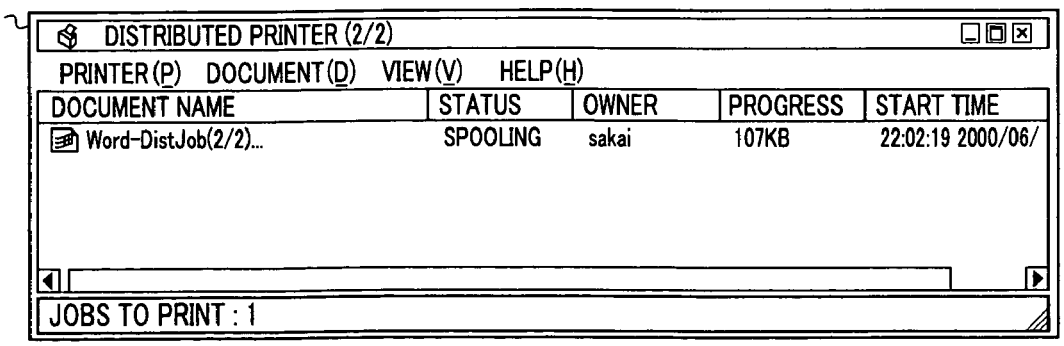

FIG. 8

| | PARENT JOB | CHILD JOB 1 | CHILD JOB 2 |
|---|---|---|---|
| (1) SPOOL PARENT JOB | SPOOLING | | |
| (2) GENERATE CHILD JOB | WAITING | SPOOLING | |
| (3) WAIT PRINT END OF CHILD JOB | WAITING | WAITING | SPOOLING |
| | WAITING | TRANSFERRING | WAITING |
| | PRINTING | PRINTING | WAITING |
| (4) CONFIRM END OF CHILD JOB 1 | PRINTING | PRINT FINISHED (DELETED) | TRANSFERRING |
| | PRINTING | | PRINTING |
| (5) CONFIRM END OF CHILD JOB 2 | PRINTING | | PRINT FINISHED (DELETED) |
| (6) FINISH DISTRIBUTED PRINT | PRINT FINISHED (DELETED) | | |

PAGE PRINTING CANCELLATION MENU

PRINT JOB SELECTED : AAAA

ENTER PAGE NUMBER FOR PRINT CANCELLATION AND CLICK OK.

[　　　] 1002

[ OK ]　[ CANCEL ]

FIG. 12
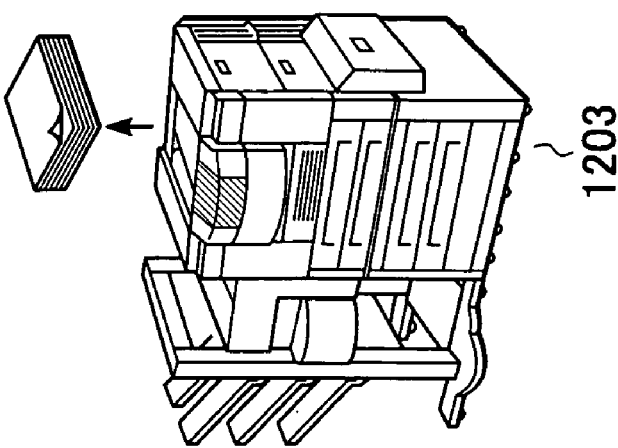
PAGE 1 TO PAGE 100
1201
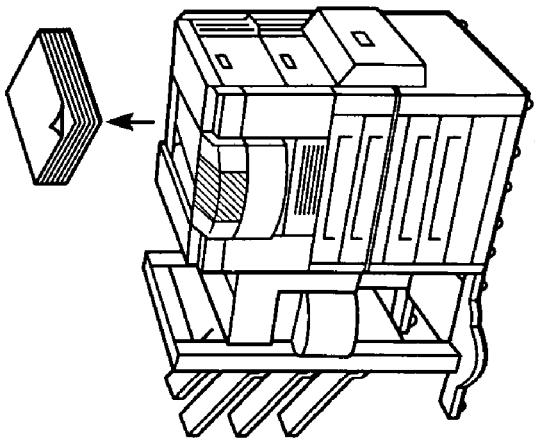
PAGE 101 TO PAGE 200
1202
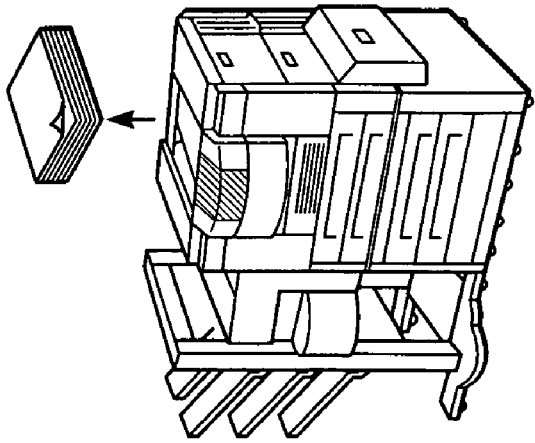
PAGE 201 TO PAGE 300
1203

INFORMATION PROCESSING APPARATUS, DISTRIBUTED PRINTING CONTROLLING METHOD, PROGRAM FOR CAUSING INFORMATION PROCESSING APPARATUS TO EXECUTE DISTRIBUTED PRINTING CONTROLLING METHOD, AND COMPUTER-READABLE RECORDING MEDIUM STORING PROGRAM

BACKGROUND OF THE INVENTION

1. Field of the Invention

The present invention generally relates to distributed printing in which a single print job is divided into a plurality of print jobs, which are output on a plurality of output devices. More specifically, the present invention relates to an information processing apparatus capable of controlling deletion of a distributed print job, a distributed printing controlling method, a program for causing the information processing apparatus to execute the distributed printing controlling method, and a computer-readable recording medium storing the program.

2. Description of the Related Art

In one distributed printing technology of the related art, a printing system comprised of information processing apparatuses and a plurality of output devices connected with each other via a network, such as printers and multi-function machines, for example, outputs data created by an information processing apparatus that is divided and distributed to a plurality of output devices to output the distributed data.

A basic example of such a distributed printing system will be described with reference to FIG. 12. FIG. 12 is a schematic diagram for showing that output data having a total of 300 pages of document data is distributed to printing devices 1201, 1202, and 1203 for distributed printing. In the example shown in FIG. 12, the output data is distributed evenly to the three printing devices so that each printing device prints 100 pages: the printing device 1202 prints pages 1 to 100; the printing device 1203 prints pages 101 to 200; and the printing device 1204 prints pages 201 to 300.

Such distributed printing allows output data having a large volume or output data including a mixture of monochrome and color pages to be distributed to optimal image processing apparatuses, thus improving the operating efficiency in light-printing applications or the like.

One distributed printing system that provides high user operability for distributed printing and facilitates printout management is shown in Japanese Patent Laid-Open No. 2002-163086 (US-AA-20020030851). In the technique disclosed in this publication, original print data is distributed to generate a plurality of child print jobs for a plurality of printing devices based on a distributed print instruction from the user. The plurality of child print jobs corresponding to the parent print job (i.e., the original print data) are processed concurrently. Therefore, user-friendly distributed printing is achieved.

In the technique disclosed in the above-described publication, a print request is made to the plurality of printer drivers. Therefore, a plurality of print jobs (i.e., child print jobs) are issued to and printed on a plurality of printing devices.

In non-distributed printing, the print job is deleted when a number of pages up to a required page have been printed. On the other hand, in distributed printing, for example, when a user mistakenly performs an operation to print all pages although the user wishes to merely print up to a certain page of document data, the following problems occur.

[First Problem]

In the technique disclosed in the publication described above in which control is effected so that a user considers a plurality of distributed print jobs as a single job, if the corresponding print job is deleted when the last page of the desired pages has been printed, other child print jobs that do not include the last page can also be deleted at the same time.

This problem will be specifically described with reference to FIG. 13. In the example shown in FIG. 13, it is presumed that the user has mistakenly performed an operation to print all 300 pages of print data, where the print data is distributed evenly so that a printing device 1301 prints pages 1 to 100, a printing device 1302 prints pages 101 to 200, and a printing device 1303 prints pages 201 to 300. In a case where the user actually only wishes to print up to page 125, if the parent print job managed by a distributed print control application as described in the above referenced publication is deleted after printing page 125 on the printing device 1302 is confirmed, all child print jobs being processed by the printing devices 1301, 1302, and 1303 are deleted. As a result, the printing device 1301 only prints pages 1 to 25, the printing device 1302 only prints pages 101 to 125, and the printing device 1303 only prints pages 201 to 225. Thus, pages 26 to 100 are not printed.

Since the user wishes to print pages 1 to 125, another request to print pages 26 to 100 is required.

[Second Problem]

In order to independently process child print jobs on a plurality of printing devices, when a printing device has printed the last page of the required pages, the child print job processed on this printing device must be deleted. In this case, the user must know prior to printing which of the plurality of printing devices will handle a particular child print job and which child print job on which printing device is to be deleted. The necessity to know this information is an inconvenience to the user.

SUMMARY OF THE INVENTION

In view of the foregoing problems, in one aspect, the present invention provides an information processing apparatus for controlling distributed printing, including a distributed print job generating unit that divides a print job into a plurality of distributed print jobs, a page specifying unit that specifies a predetermined page up to which the print job is output, and an output cancellation issuing unit that issues an instruction for canceling outputting after the predetermined page specified by the page specifying unit has been outputted to an output device that outputs a distributed print job that includes the predetermined page.

In another aspect, the present invention provides a distributed printing controlling method including a distributed print job generating step of dividing an original print job into a plurality of distributed print jobs, a page specifying step of specifying a predetermined page up to which the original print job is output, and an output cancellation issuing step of issuing an instruction for canceling outputting after the predetermined page specified in the page specifying step has been outputted to an output device that outputs a distributed print job that includes the predetermined page.

In still another aspect, the present invention provides a program executed by an information processing apparatus for controlling distributed printing, including a distributed print job generating step of dividing an original print job into a plurality of distributed print jobs, a page specifying step of specifying a predetermined page up to which the original print job is output, and an output cancellation issuing step of issuing an instruction for canceling outputting after the predetermined page specified in the page specifying step has been outputted to an output device that outputs a distributed print job that includes the predetermined page.

In still another aspect, the present invention provides a memory medium storing a computer-readable program for controlling distributed printing, including a distributed print job generating module for dividing an original print job into a plurality of distributed print jobs, a page specifying module for specifying a predetermined page up to which the original print job is output, and an output cancellation issuing module for issuing an instruction for canceling outputting after the predetermined page specified by the page specifying module has been outputted to an output device that outputs a distributed print job that includes the predetermined page.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is an illustration showing an example display that is provided by the program module (function) of the present invention.

FIG. 8 is a table showing the print job status transition in distributed print processing according to the present invention.

FIG. 10 is a schematic view of a page printing cancellation screen in the present invention.

FIG. 12 is a diagram showing known distributed print processing.

DESCRIPTION OF THE PREFERRED EMBODIMENTS

An embodiment of the present invention will now be described in detail with reference to the drawings.

Figure 1:
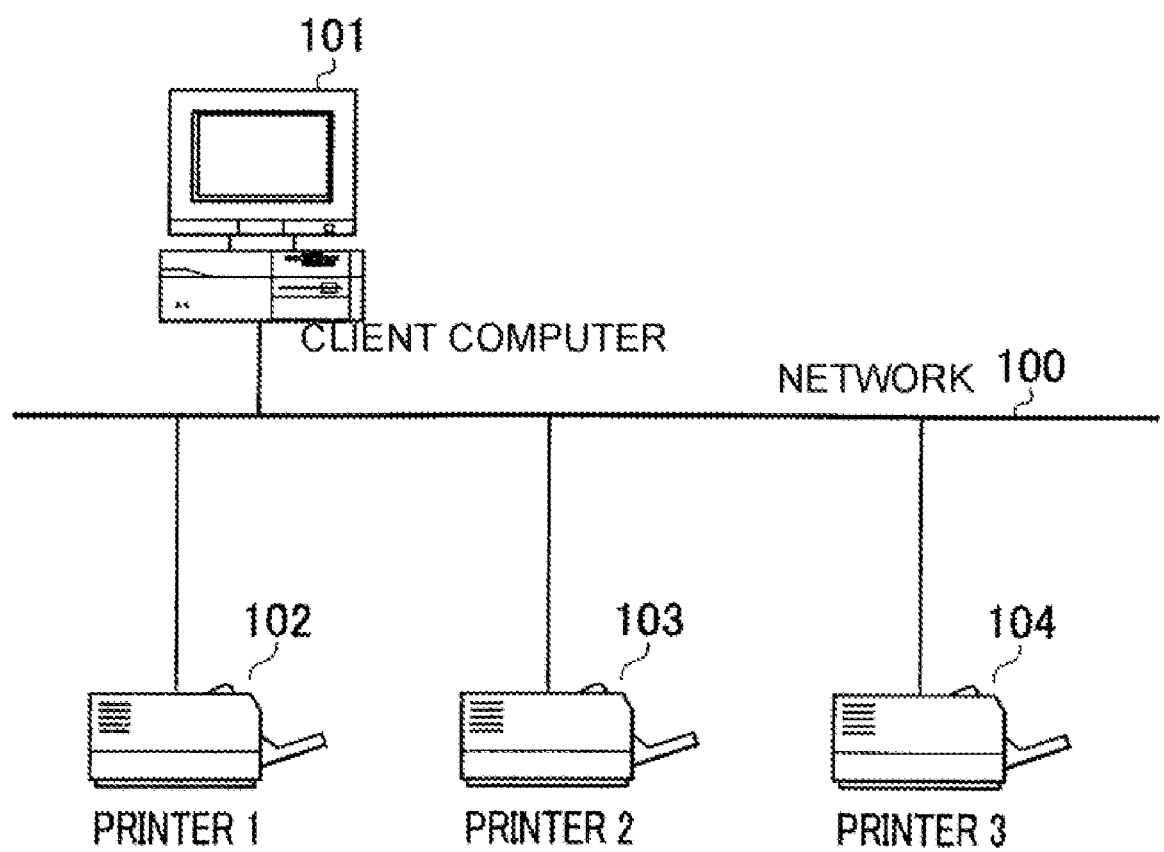
FIG. 1 is a diagram of an example printing system including an information processing apparatus according to the present invention.

FIG. 1 is a schematic diagram of a distributed printing system including an information processing apparatus according to this embodiment. The system shown in FIG. 1 includes a client computer (hereinafter referred to as a "client") 101 that is an implementation of the information processing apparatus according to the present invention. A print control program of the present invention is implemented in the client 101 to execute distributed print processing. A plurality of printer drivers, corresponding to a plurality of printing devices (hereinafter referred to as "printers") 102 to 104 connected over a network 100 to the client 100, are installed in the client 101.

Upon receiving print jobs from the client 101, the printers 102 to 104 conduct print processing. In the following description, the information processing apparatus according to the illustrated embodiment is implemented, by way of example, as a client computer. The present invention, however, is not limited thereto. For example, the information processing apparatus may be applied to a print server, where the print server executes processing similar to that described below.

As used herein, the term print job means a set of print data from a job start command to a job finish command. Each printer executes print processing in units of print jobs. That is, interruption of other print jobs is prohibited.

Print data means commands for controlling the image content of the print job or commands for controlling the printer. The printer driver implemented in the client 101 permits print commands (i.e., DDI function) received from an application via an operating system (OS) to be converted into print data (i.e., "printer control language (PCL)" or "page description language (PDL)"), and a print job having a set of print data is issued to a specific printer.

As described in detail below, the client 101 spools the print commands from the application in a predetermined data format (i.e., the EMF or RAW spool format), and issues a plurality of print jobs that are generated by the plurality of printer drivers.

Figure 2:
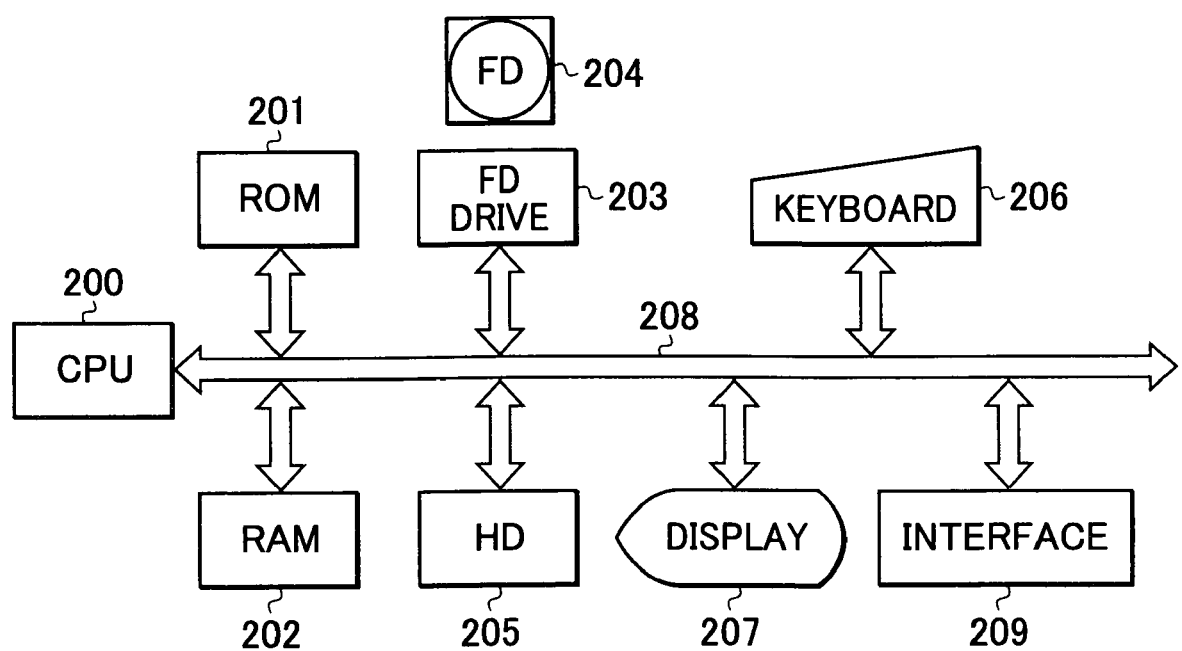
FIG. 2 is a block diagram showing the functional structure of the information processing apparatus according to the present invention.

FIG. 2 is a block diagram showing the hardware configuration of the client 101 shown in FIG. 1. Referring to FIG. 2, a central processing unit (CPU) 200 controls the overall functionality of client 101. A read-only memory (ROM) 201 stores various programs and data for controlling the client 101. The CPU 200 executes various processing operations on the client 101 in accordance with the program stored in the ROM 201 or a random access memory (RAM) 202 while using the RAM 202 as a work memory.

Figure 3:
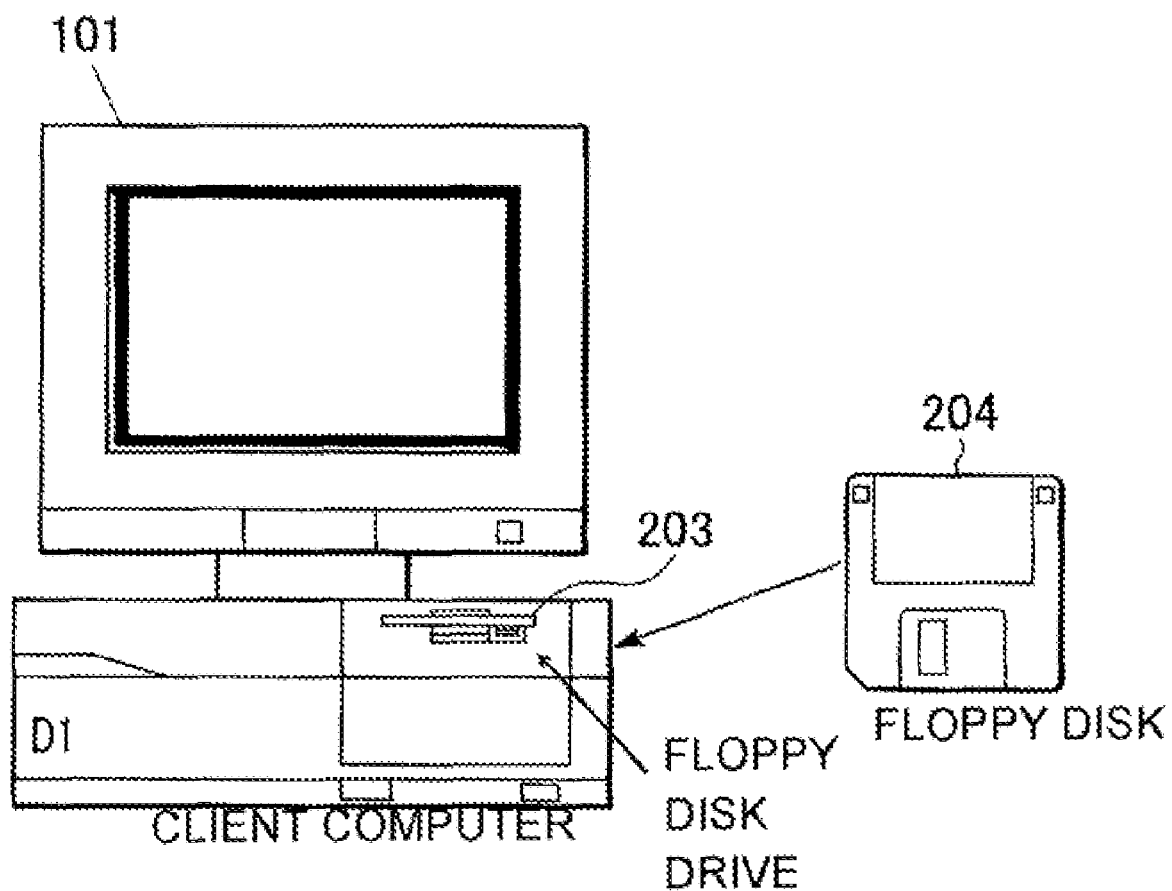
FIG. 3 is a diagram showing the information processing apparatus and a storage medium.

A floppy disk (FD) drive 203 reads and writes data (program) from and to a floppy disk (FD) 204, which is a storage medium containing the control program of the present invention. As shown in FIG. 3, when the FD 204 is inserted into the FD drive 203, data is input and output between the client 101 and the FD 204.

Figure 4:
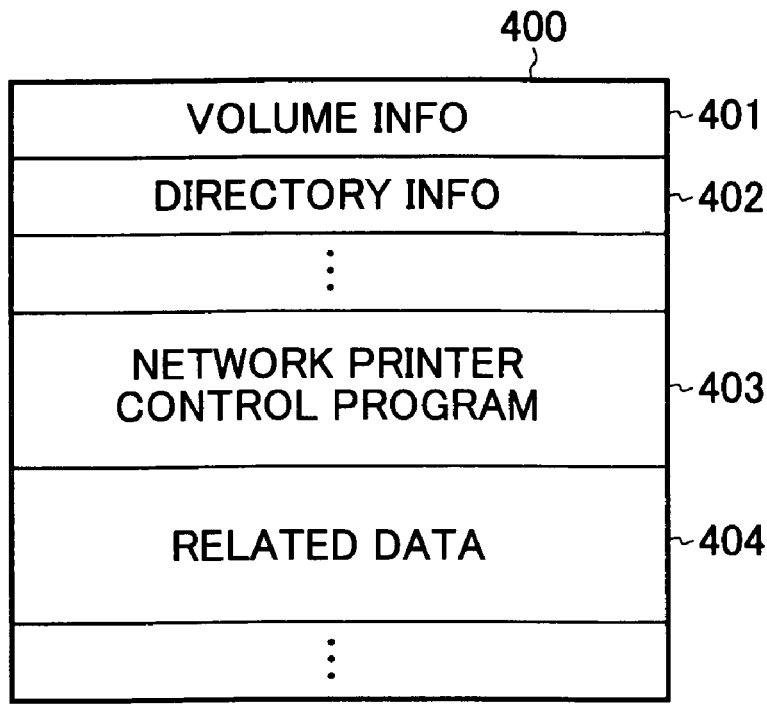
FIG. 4 is a memory map showing the data arrangement of a program module stored in the storage medium.

The internal data structure of the FD 204 will be described with reference to FIG. 4. FIG. 4 is a memory map 400 showing the internal data structure of the FD 204. The FD 204 contains volume information 401, directory information 402, network printer control program 403 for the printers 102 to 104, and related data 404.

Figure 5:
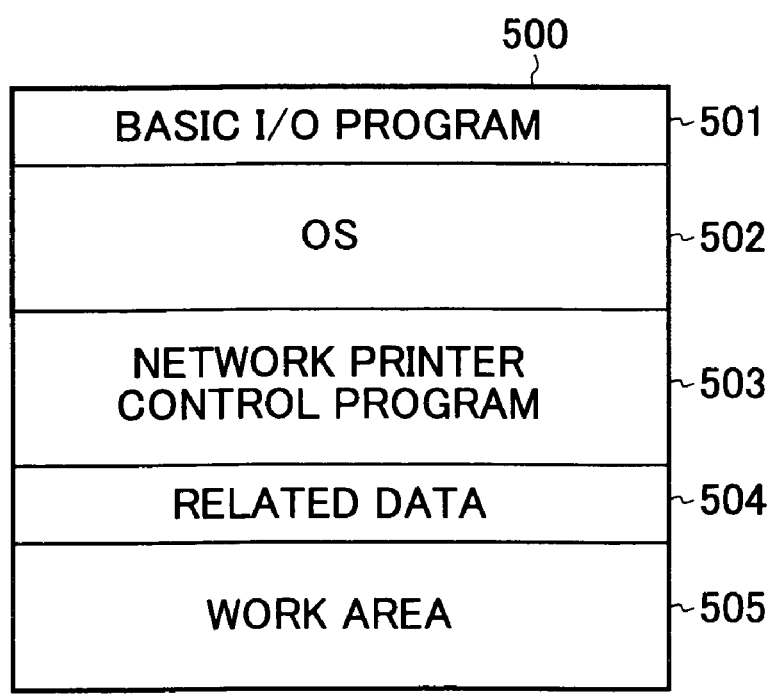
FIG. 5 is a memory map of the program module that is extended from the storage medium into a RAM.

FIG. 5 shows a memory map 500 of the RAM 202. As shown in FIG. 5, the RAM 202 includes an area for a basic input/output (I/O) program 501, an operating system (OS) 502, a network printer control program 503 that is loaded from the FD 204, related data 504, and a work area 505.

In this embodiment, the FD 204 represents the storage medium that stores a control program according to the present invention, and the FD drive 203 represents the input/output device for the control program. The present invention is not limited to this storage medium and input/ output device, and any storage medium and associated input/output device that would allow practice of the present invention is applicable.

Referring back to FIG. 2, a hard disk (HD) 205 is used as an external memory. The application software and the print control program of the present invention loaded from the FD 204 via the FD drive 203 are installed on the HD 205.

A keyboard 206 is an input device having a function of inputting an instruction from the user. The input device of the present invention is not limited to a keyboard, and any input device, such as a mouse, that would enable practice of the present invention is applicable.

Display 207 is a display unit, and may be a cathode-ray tube (CRT) display or a liquid crystal display (LCD). The display 207 has a function of displaying a user interface provided by the print control program in accordance with commands from the OS.

The contents displayed on the display 207 are a result of instructions provided by the CPU 200, which serves as a display control unit. The display 207 processes a signal based on the instruction(s) of the CPU 200 to provide predetermined content on the display 207.

For example, a user interface shown in FIG. 7, described below, is also displayed on the display 207 by processing a signal based on an instruction of the CPU 200.

A network interface 209 has a function of connecting the client 101 to a local area network (LAN) in the manner shown in FIG. 1, and enabling communication with an external device. The network interface 209 is preferably a network interface board or a network interface card.

The CPU 200, the ROM 201, the RAM 202, the FD drive 203, the HD 205, the keyboard 206, the display 207, and the interface 209 are connected with each other via a system bus 208 to mutually exchange data.

Figure 6:
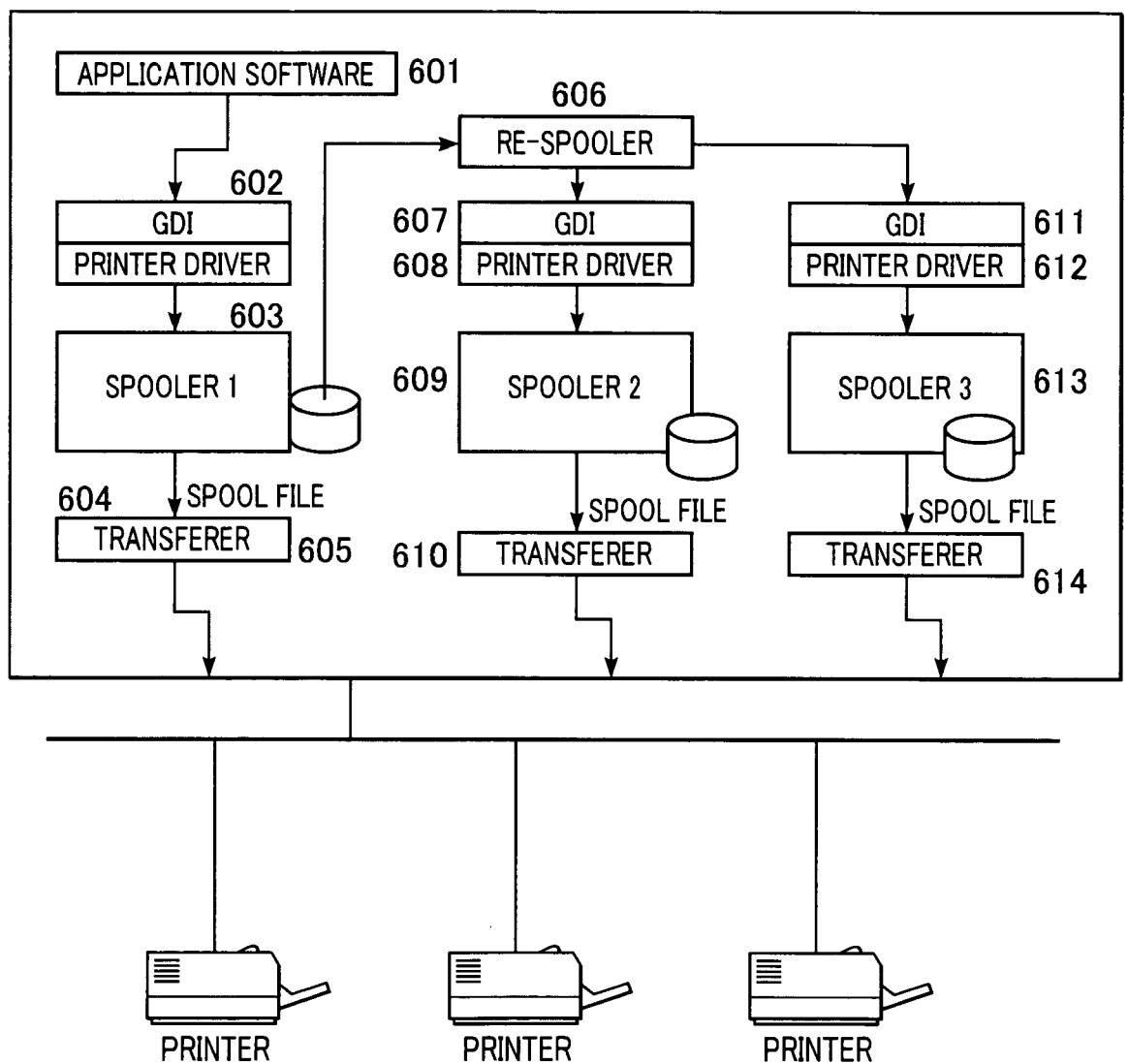
FIG. 6 is a functional block diagram of an example printing system that operates and displays the print job to be distributed according to the present invention.

FIG. 6 is a block diagram of a distributed printing system that operates and displays distributed print jobs in accordance with the print control program (method) of the present invention. The distributed printing system shown in FIG. 6 is implemented by a Microsoft Windows® spooler and a combination of print processing operations.

While the present invention will be described in the context of a display function and printing system using a Microsoft Windows® operating system, any operating system and/or spooler that would enable practice of the present invention is applicable.

The distributed printing method according to the present invention is not necessarily a distributed printing method in which a specific operating system, hardware specification, or distribution type is designated, as long as distributed print processing to a plurality of printers is done based on a single print instruction from application software.

That is, the present invention may apply to a distribution method in which child print jobs are generated from a parent print job and are output to a plurality of printers. Examples of distributed print processing include number-of-copies distribution in which a predetermined number of copies are allocated to each output destination, page distribution in which a predetermined number of print pages are allocated to each output destination, and a distribution method, which is one type of page distribution, in which a print job is allocated to output devices page-by-page depending upon the purpose of the user or print conditions, such as color/monochrome printing.

As shown in FIG. 6, the user is able to instruct distributed printing to application software (hereinafter referred to as "application") having a function of creating a document, including document format, table format, image file, DTP, and so forth. For example, a single virtual printer driver (hereinafter referred to as a "distributed print driver") is produced in advance for distributed printing. This distributed print driver actually has a module for invoking a plurality of printer drivers. Upon receiving print commands, the distributed print driver spools the print commands in a predetermined data format (e.g., enhanced meta-file (EMF) format), and automatically distributes the print commands to a plurality of printer drivers set by the distributed print driver to request printing. The print commands transferred to each driver are print commands that include all page numbers whose page numbers are specified for each printer driver. Thus, each printer driver produces print data of the specified page numbers.

In FIG. 6, when the user instructs printing of the document from the application 601 to the distributed print drivers, the application outputs the print commands (GDI function) to a graphics device interface (GDI) 602, which is a graphic engine of the operating system. An EMF spooler (not shown) is disposed between the application and the GDI for spooling the content of the print commands output from the application in the form of binary EMF. EMF is well known in the art, and therefore, a detailed description thereof is omitted.

The GDI, which is a graphic engine of the operating system, converts the print commands (GDI function) into print commands (DDI function) interpretable by the printer driver 603 that outputs them. The printer driver produces print data of the required page numbers on the basis of the print commands (DDI function) obtained from the GDI and the specified page numbers, and outputs the print data to a spooler 1 (RAW spooler) 604. The spooler 1 outputs the print data spooled therein to the printers connected to the LAN via a transferring unit 605 in predetermined units so that the print data is printed on predetermined printers.

For simplification of illustration, the spooler 1 used herein falls within the same group as a RAW spooler for spooling the print data, and an EMF spooler for spooling the EMF data that has not yet been transferred to the GDI. More specifically, as described above, the EMF spooler that spools the data output from the application is disposed prior to the GDI. The EMF data spooled in the EMF spooler and the specified page numbers are transferred to a re-spooler 606 (i.e., a module of the print control program) based on the commands from the distributed print driver. The print commands and the specified page numbers are output again to a second printer driver 608 for a printer specific to a distributed print job via a GDI 607 so that the printer driver can generate print data, and the print data is output to the printer via a spooler 2 609. As with the spooler 1 604, the spooler 2 609 outputs the print data via a transferring unit 610. If necessary, when the print data is distributed to three or more printers, the print commands and the specified page numbers are output again from the re-spooler 606 to a third printer driver 612 via a GDI 611 so that the printer driver can generate print data, and the print data is output to the printer via a spooler 3 613. As with the spooler 1 604 and the spooler 2 609, the spooler 3 613 outputs the print data via a transferring unit 614.

In the printing system shown in FIG. 6, the spool file is an EMF file. If the printers that perform distributed printing are of the same type, the printer languages of the print data are the same, and the RAW spooler may be used. In this case, the first printer driver produces print data so as to include all pages whose page numbers are specified for each distributed-print-job-specific printer.

Automatically conducting such distributed print processing eliminates the burden on the user, and requires the application to issue print commands only once, thus releasing the user from any involvement in the details of the print processing. The user is able to perform other processing during the print processing, thus achieving user-friendly distributed printing.

FIG. 7 illustrates an example display of printer objects to be operated and displayed by the print job being distributed for distributed print processing. The print job status for a distributed print job may be acquired in a similar way to acquisition of standard print job status, using any means known in the art. For example, the status may be acquired by direct polling from the client to a print server or printer (not shown). Alternatively, the status may be reported from a print server, or may be reported directly from a printer using a trapping function.

Using any of the means for acquiring a print job status, all of the statuses associated with the distributed print job, i.e., the statuses of the original or parent print job and the distributed or child print jobs, can be obtained.

The parent print job corresponds to the distributed print job that the application requests via the print commands. The child print jobs are actual print jobs that are distributed and sent to the printers that execute distributed printing. More specifically, the parent print job is generated on the basis of the print commands requested by the application, and is stored as a spool file. The spool file corresponding to the parent print job is, for example, an EMF file as described above. However, the present invention is not limited to this file format, and the spool file of the present invention may be any file that can be converted into PDL in order to generate child print jobs to be issued to a plurality of printers compatible with different page description languages.

The child print jobs are separate print jobs, with each including print data generated by a printer driver corresponding to a distributed-print-job-specific printer from the spool file. The spool file is a file that can be converted into PDL (e.g., an EMF file) corresponding to the original parent print job that is transferred via the re-spooler in accordance with the commands from the distributed print driver.

FIG. 7 shows a user interface screen (hereinafter referred to as "UI") 701 for displaying and operating the original parent print job. The UI 701 is displayed on the display 207 by the print control program by double-clicking an icon (not shown) of the distributed print driver. In the UI 701, the status or state of the parent print job is shown as "spooling". "Spooling" means that the print data is currently being spooled to the printer (i.e., the print data is currently being transferred to the printer and stored in the printer's memory). Other statuses include "waiting", "printing", "print finished (deleted)", "error", etc. For example, when menu "distributed printer" (not shown) is selected from the "Printer" option in the UI 701, dialog boxes (UIs) 702 and 703 are shown.

The UIs 702 and 703 are dialog boxes for displaying and operating the child print jobs generated from the parent print job for distributed printing to two output devices. The user can extract the child print jobs corresponding to the parent print job from the UI of the parent print job, and can therefore readily know the current state of the overall distributed print processing merely by viewing the display of the parent print job. The user can also readily extract information about the plurality of child print jobs corresponding to the parent print job. Moreover, even in the environment where a mixture of the child print job and other standard print jobs is processed on a printer, the user is able to readily distinguish the child print job associated with the parent print job. The displays of the child print jobs are not limited to the example illustrated in FIG. 7. In the UIs 702 and 703, the states of the child print jobs corresponding to the parent print job are shown in separate display frames, whereas a list of child print jobs corresponding to the parent print job may be shown in a single display frame. In this case, the list of child print jobs shown in the single display frame corresponds to a list of the output destinations and states of the child print jobs that are extracted in association with a predetermined parent print job specified from a UI in which a list of a plurality of parent print jobs is shown.

It is to be noted that the status or state of the parent print job in the UI 701 shown in FIG. 7 does not represent the status of the print data itself that is generated as the original print data, but represents a virtual status that is produced on the basis of a combination of the statuses of a plurality of child print jobs divided from the original print data. This virtual status of the parent print job is presented to the user, thus allowing the user to readily know, for example, whether or not the overall distributed print processing is completed, without confirming the respective statuses of the plurality of child print jobs divided from the parent print job. Therefore, advantageously, in order to know the print status of a single document of which a print instruction is initially requested by the user, the user is only required to know the status of the parent print job regardless of the distributed printing method, the number of child print jobs, or the statuses of the child print jobs.

Accordingly, on a dialog box of the virtual printer driver, the status display or any operation of the parent print job to be distributed is accepted. Moreover, on dialog boxes of distributed-print-job-specific printers, the status display or any operation of the child print jobs is accepted. Thus, the user is able to clearly know the state of the distributed print jobs and to easily understand each job operation.

FIG. 8 is a table showing example state transitions of the parent print job (abbreviated in FIG. 8 as "parent job") and the parent print job's associated child print jobs (abbreviated in FIG. 8 as "child job").

As described above, the original print job is referred to as a parent print job (i.e., the parent job) and the jobs generated for distributed print processing are referred to as child print jobs (i.e., the child jobs). In the information processing apparatus of the present invention, the status of the parent print job is determined on the basis of a combination of the statuses of the child print jobs in the manner shown in FIG. 8. Thus, the user can easily determine the status of the overall print job from the status of the parent print job without relying on the statuses of the individual child print jobs that may not be in sync with each other. The list of statuses depicted in FIG. 8 is merely an example of some of the statuses associated with the present invention. Additional statuses, such as "error" are also included as part of the present invention. If the status of any of the child print jobs is "error", the status of the parent print job may also be "error". In the following description, the parent print job and the child print jobs in this embodiment are distinguished from each other.

The basic structure of a distributed printing system has been described. The features of the present invention will now be described.

The information processing apparatus (client 101) according to the present invention controls distributed print processing, and has a distributed print control function (i.e., the processing of the print control program according to the present invention in which EMF data including a specified page number is transferred to each printer driver). In the distributed print control function, when the operator inputs a distributed print instruction (i.e., print commands to each distributed print driver) to the print control program, data to be printed (i.e., GDI function, which is the print commands output from the application, or associated EMF data) is divided so as to generate a plurality of child print jobs for a plurality of printers using printer drivers that drive the respective printers to print the data. The information processing apparatus of the present invention also has a display control function of distinguishably displaying the statuses of the plurality of child print jobs (the UIs 702 and 703 shown in FIG. 7) generated by the distributed print control function and the status of the parent print job (the UI 701 shown in FIG. 7) corresponding to the plurality of child print jobs. In the illustrated embodiment, the statuses of the child print jobs and the status of the parent print job are shown using different dialog boxes. Alternatively, the parent print job may be shown, as, for example, category "parent", in a list of child print jobs described below. The information processing apparatus of the present invention also has an operating control function of, in response to a parent print job operation command, operating the plurality of child print jobs corresponding to the parent print job in the same manner, as described below with reference to FIG. 9 and the like.

In the operating control function according to this embodiment, the print job is deleted based on a specified page, as described with reference to FIG. 9.

Figure 9:
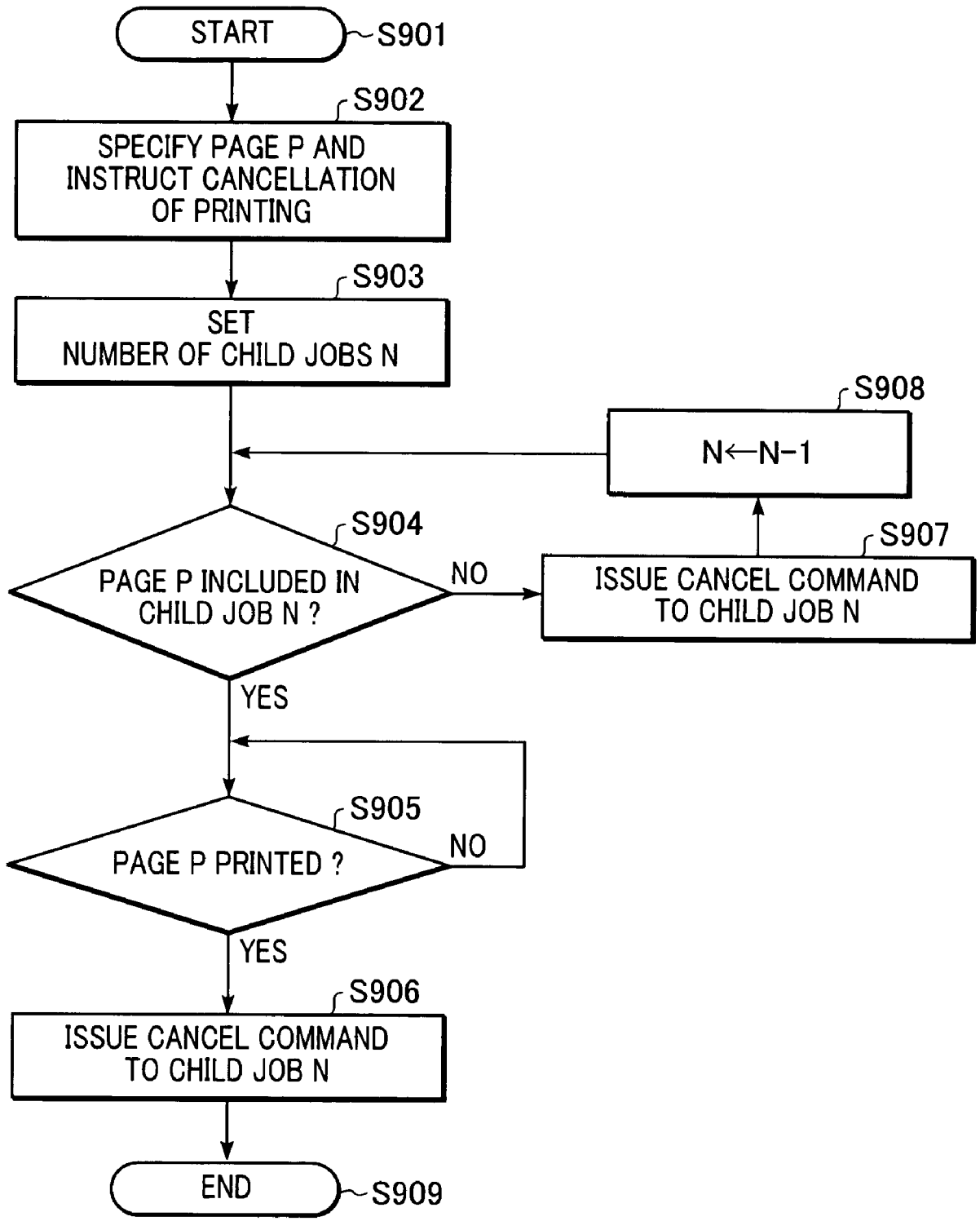
FIG. 9 is a flowchart showing a page printing cancellation procedure for an original job according to the present invention.

FIG. 9 is a flowchart showing a procedure for print cancellation based on a specified page, which is implemented by the print control program of the present invention. In the following description, the processing of steps shown in the flowchart of FIG. 9 is implemented by, under the control of the CPU 200 of the information processing apparatus, reading program code that is stored in a nonvolatile storage unit, such as the ROM 201 or the HD 205, and executing the operation in accordance with the read program code. However, if a portion of or the entirety of the steps in the flowchart is performed by a print server or a printer, each time the processing of the steps is implemented, program code that is stored in a non-volatile storage unit is read and the operation is executed in accordance with the read program code under the control of a CPU of the print server or printer.

Referring to FIG. 9, the process starts in step S901. In the initial state, it is presumed that a parent print job is distributed to child print jobs, and the parent print job and the child print jobs are displayed on the dialog-box-based UIs shown in FIG. 7. The statuses of the jobs may be arbitrary as long as the jobs can be deleted based on a specified page.

In step S901, the user uses an input device such as a mouse or a keyboard to display the parent print job on a UI. In step S902, "page printing cancellation menu" (not shown) is selected from the "Document" menu on the UI 701. FIG. 10 shows a dialog box 1001 for entering the page based on which print cancellation is to be performed. The user enters the selected page number ("P") in box 1001 to instruct cancellation of printing. The dialog box 1001 is associated with the status screen of the parent print job.

After the page number upon which print cancellation is based is entered in step S902, in step S903, the printing system (print control program) that manages the corresponding parent print job refers to management information, stored in the RAM 202, of the child print jobs that is associated with job management information, stored by the RAM 202 of the corresponding parent print job, and sets the number of child print jobs to a variable N.

Figure 11:
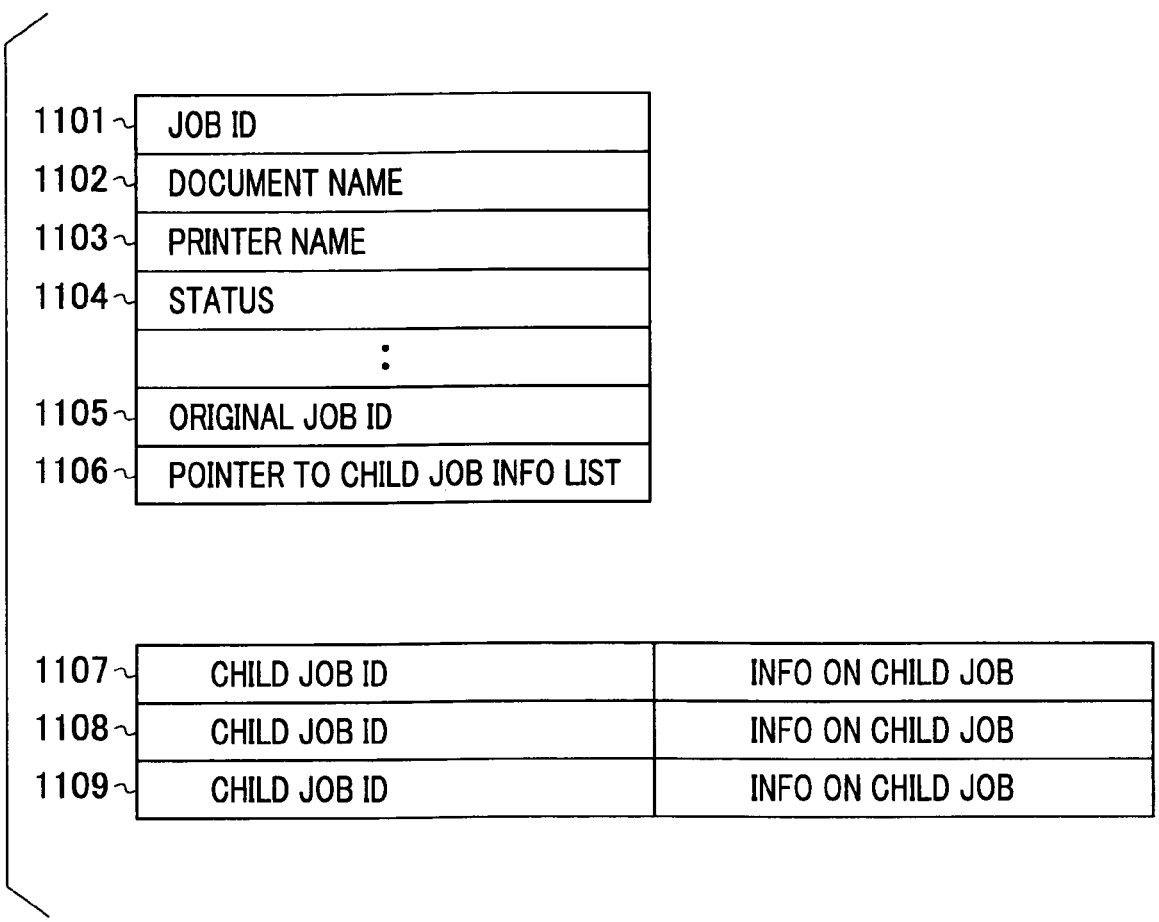
FIG. 11 is an illustration of an example of job management information according to the present invention.
Figure 13:
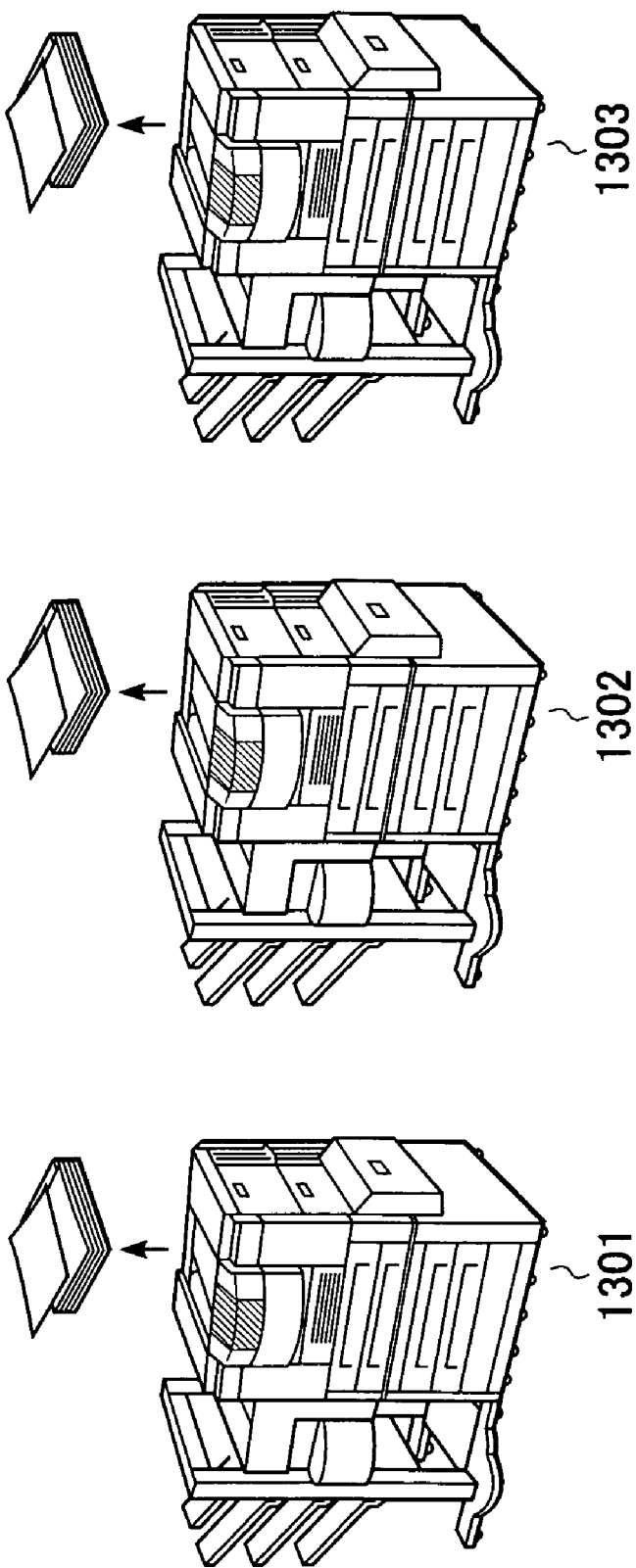
FIG. 13 is a diagram showing job deletion in distributed print processing of the related art.

FIG. 11 depicts a specific example of the job management information referred to by the information processing apparatus (client) 101. FIG. 11 shows a portion of the job management information of the present invention, including a job ID 1101 for identifying the job, a document name 1102 that indicates the name of the print job (document), a printer name 1103 that indicates the name of the printer in which the job is spooled, a status 1104 that indicates job or printer-related information, such as the operating state or the error status of the printer, an original job ID 1105, and a pointer 1106 to a child print job information list. Information of the child print jobs is stored at the address contained in pointer 1106. In the example shown in FIG. 11, information for referring to items 1107 to 1109 is stored in pointer 1106. Items 1107 to 1109 contain IDs of the child print jobs and information indicating the document name, status, output printer, the number of pages, etc., which are associated with the ID of the respective child print jobs.

In the job management information for the parent print job, the original job ID 1105 includes information for identifying the print job as the original job, for example, "XXXX", and the pointer 1106 includes a pointer for referring to information of each of the child print jobs generated from the print data of the parent print job.

In the job management information for the child print job(s), the job ID 1101 includes an ID of the particular child print job, and the original job ID 1105 includes an ID of the original parent print job. The parent print job corresponding to this child print job is determined by referring to the original job ID 1105. The pointer 1106 includes information for identifying the particular child print job as a child print job. The pointer 1106 may include a pointer for referring to information such as the statuses of other child print jobs. In this case, any remaining child print jobs are determined from the job management information for a particular child print job.

The job management information in the present invention is not limited to that described above. The parent print job may refer to or update the information for each child print job, or vice versa, and the information for the parent and child print jobs may be updated in a synchronous manner, thus realizing the relationship between the parent print job and the child print jobs in the present invention.

Referring back to the flowchart of FIG. 9, in step S904, it is determined whether or not the specified page P is contained in the job of the variable N that is set in step S903. If the page P is contained in the job N, in step S905, it is determined whether or not the page P has been printed. If the page P has not yet been printed, monitoring is continuously performed until the page P is outputted. Following the output of the page P, in step S906, a command for deleting the child print job N is issued to the printer on which the job N is being printed. Upon receiving the command, the printer stops the printing. The process then ends in step S909.

If it is determined in step S904 that the page P is not contained in the job N, then in step S907, a command for deleting the job N is issued to the printer on which the job N is being printed. Upon receiving the command, the printer stops the printing.

In step S908, the variable N indicating the number of jobs is decremented by one, and the process returns to step S904.

While specified-page-based print cancellation in distributed print processing has already been described, the series of operations will now be described again. It is assumed that, as shown in FIG. 12, the user uses the printer driver of the client 101 to instruct the start of distributed printing of a document containing pages 1 to 300 so that child print jobs for outputting pages 1 to 100, pages 101 to 200, and pages 201 to 300 are generated and issued to the printers 1201, 1202, and 1203, respectively, by means of the print control program. For convenience of illustration, the job issued to the printer 1201 is indicated by child job 1 and is given a job ID 1, the job issued to the printer 1202 is indicated by child job 2 and is given a job ID 2, and the job issued to the printer 1203 is indicated by child job 3 and is given a job ID 3. As described above with reference to FIG. 11, the job IDs 1 through 3 and detailed information associated with the child jobs 1 through 3 are stored in the RAM 202 as job management information.

When the child print jobs 1 through 3 are issued, the printers 1201, 1202, and 1203 start outputting the respective pages.

After the user has initiated printing, and the user wishes to cancel the printing after page 125 is printed, this page number is entered in the page number entry dialog box 1001 shown in FIG. 10 in the UI 701 in which the parent print job is presented (steps S901 and S902).

Upon receiving the command for canceling printing after page 125, the print control program refers to the management information for the child print jobs associated with the job management information stored in the RAM 202 to set the number of child print jobs, i.e., 3, as the variable N (step S903). The variable N is set by referring to the child print job IDs shown in FIG. 11.

Then, it is determined whether or not the child job 3 having the job ID 3 contains the specified page number, i.e., page 125 (step S904). Since it is determined from the management information corresponding to the job ID 3 that the child job 3 is a job for outputting pages 201 to 300, the print control program issues a command for deleting the print job to the printer 1203 on which the child job 3 is being output (step S907). Upon receiving the command, the printer 1203 stops printing.

Then, it is determined whether or not the specified page number, i.e., page 125, is contained in the child job 2 having the job ID 2 (step S904). When it is determined from the management information corresponding to the job ID 2 that the child job 2 is a job for outputting pages 101 to 200, it is determined whether or not the specified page, i.e., page 125, has been output based on counter information or the like that is stored in the printer (step S905). If the page has not yet been output, the processing of step S905 is repeated. If the specified page has been output, the print control program issues a cancel command to the child job 2 having the job ID 2 (step S906), and causes the child job 2 to immediately stop printing.

If it is determined in step S905 that the specified page has not yet been output, but if the print control program issues a command that indicates "stop subsequent printing when page '125' has been output" to the printer and the command is interpretable by this printer, the determination in step S905 need not be repeated. In this case, more efficient cancellation is achieved.

The child job 1 having the job ID 1 is a job for outputting pages 1 to 100, and, therefore, the printing of the child job 1 is completed without any particular instruction.

Accordingly, the user is able to complete the printing up to a desired page, and more pages than necessary are not printed. The printing of the desired page and the previous pages, in the example described above, pages 1 to 125, is not cancelled.

In FIG. 9, in the illustrated embodiment, the number of child print jobs (distributed print jobs) is N, and it is determined whether or not a specified page at which to cancel printing subsequent pages is contained in the jobs in turn starting from the job N. However, the present invention is not limited thereto. For example, the page number at which to cancel printing may be entered in a management program or the like for managing the number of pages allocated to each distributed print job to thereby designate the distributed print job to be deleted.

In the illustrated embodiment, cancellation of page printing based on a specified page is performed using a user interface screen that is provided by the distributed print control program. The present invention is not limited to this method of canceling printing. For example, when a child print job that is processed by a printing device is deleted on an operation panel or the like during distributed print processing, the distributed print control program may detect the job deletion by reporting the event or polling from the printing device, and may issue a child-print-job deletion command to the printing device on which the child print job, including the pages subsequent to the page printed by the deleted child print job, is being output.

While the illustrated embodiment of the present invention has been described in the context of the operation on an operating system installed in a PC, such as Microsoft Windows®, any other operating system or any device other than a PC may be used as long as different spool methods or printer control are performed on a plurality of output devices and a single job is output from the plurality of output devices.

The present invention may also apply to distributed print processing in which when the print data desired by the user is handled as a single job and a plurality of new jobs are generated from this print data. For example, when the print data is divided into a plurality of jobs, copies of the print data are produced to increase the number of copies.

The present invention does not only apply to operation and display of print jobs on a host computer that have not been transferred to printers, but also to print jobs in any state in which jobs, print data, or job management information exists in the print system, such as a job spooled in printers, a job during print processing, and a job waiting to print.

The present invention may also be implemented as a system composed of a plurality of devices (e.g., a host computer, an interface, a reader, a printer, etc.), or an arrangement composed of a single device, such as a multi-function machine, a printer, or a facsimile machine.

The foregoing object of the present invention is also achieved through the provision of a storage medium having program code of software for implementing the features of the embodiment described above, from which the program code stored in the storage medium is read by a computer (or a CPU or an MPU) of the system or apparatus.

In this case, the program code read from the storage medium realizes the features of the embodiment described above. The storage medium that stores this program code or the program code itself constitutes the present invention.

Storage media for providing program code include, but is not limited to, a floppy disk, a hard disk, an optical disk, a magneto-optical disk, an MO, a CD-ROM, a CD-R, a DVD, a magnetic tape, a non-volatile memory card, and a ROM.

The program code read by the computer is executed to realize the features of the embodiment described above. In addition, the operating system or the like running on the computer executes a portion of or the entirety of the actual processing in accordance with an instruction of the program code to implement the features of the embodiment described above.

Moreover, the present invention also encompasses a case where the program code read from the storage medium is written to a memory of a function extension board inserted into the computer or a function extension unit connected to the computer, after which a CPU or the like of the function extension board or function extension unit executes a portion of or the entirety of the actual processing in accordance with an instruction of the program code, to thereby realize the functions of the embodiment described above.

According to the present invention, therefore, in distributed print processing in which a plurality of child print jobs are processed on a plurality of output devices, once the user instructs print cancellation of the original parent print job corresponding to the child print jobs while specifying a particular page at which the parent print job is to be canceled, the user cancels outputting after the specified page without being aware of or knowing the status of the child print job for outputting the specified page. Thus, unnecessary pages are not printed, while the specified page and the previous pages are successfully printed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for controlling distributed printing, comprising:
   a distributed print job generating unit that divides an original print job into a plurality of distributed print jobs;
   a page specifying unit that specifies a predetermined page up to which the original print job is output, wherein the predetermined page is specified after printing has started; and
   an output cancellation issuing unit that issues an instruction for canceling outputting after the predetermined page specified by the page specifying unit has been outputted to an output device that outputs a distributed print job that includes the predetermined page,
   wherein the output cancellation issuing unit controls an output device that outputs a distributed print job that does not include the predetermined page and that outputs pages subsequent to the predetermined page so as to cancel the output, and controls an output device that outputs a distributed print job for outputting pages previous to the predetermined page so as to continue to output the distributed print job.

2. An information processing apparatus according to claim 1, wherein the output cancellation issuing unit includes a determining unit that determines which of the plurality of distributed print jobs includes the predetermined page specified by the page specifying unit, and, when the number of distributed print jobs divided from the original print job is N, where $N \geq 2$, the determining unit then determines, starting from the Nth job, whether the plurality of distributed print jobs include the predetermined page, wherein the output cancellation issuing unit issues the instruction for canceling outputting, based on the results of the determining unit, after the predetermined page specified by the page specifying unit is printed.

3. A distributed printing controlling method for controlling distributed printing, comprising:
   dividing an original print job into a plurality of distributed print jobs;
   specifying a predetermined page up to which the original print job is output, wherein the predetermined page is specified after a designation of printing of the original print job is designated by a user; and
   issuing an instruction for canceling outputting after the specified predetermined page has been outputted to an output device that outputs a distributed print job that includes the predetermined page,
   wherein issuing an instruction for canceling outputting includes controlling an output device that outputs a distributed print job that does not include the predetermined page and that outputs pages subsequent to the predetermined page so as to cancel the output, and controlling an output device that outputs a distributed print job for outputting pages previous to the predetermined page so as to continue to output the distributed print job.

4. A distributed printing controlling method according to claim 3, wherein issuing an instruction for canceling the outputting includes determining which of the plurality of distributed print jobs includes the specified predetermined page, and when the number of distributed print jobs divided from the original print job is N, where $N \geq 2$, it is then determined, starting from the Nth job, whether the plurality of distributed print jobs include the predetermined page, wherein the instruction for canceling outputting after the specified predetermined page is printed is issued based on whether the plurality of distributed print jobs include the predetermined page.

5. A computer-readable medium embodying a program of instruction executable by a machine for controlling distributed printing, the program comprising:
   a distributed print job generating module for dividing an original print job into a plurality of distributed print jobs;
   a page specifying module for specifying a predetermined page up to which the original print job is output, wherein the predetermined page is specified after printing is started; and
   an output cancellation issuing module for issuing an instruction for canceling outputting after the predetermined page specified by the page specifying module has been outputted to an output device that outputs a distributed print job that includes the predetermined page,
   wherein the output cancellation issuing module controls an output device that outputs a distributed print job that does not include the predetermined page and that outputs the pages subsequent to the predetermined page so as to cancel the output, and outputs an output device that a distributed print job for outputting the pages previous to the predetermined page so as to continue to output the distributed print job.

6. A computer-readable medium according to claim 5 wherein the output cancellation issuing module includes a determining submodule for determining which of the plurality of distributed print jobs includes the predetermined page specified by the page specifying module, and, when the number of distributed print jobs divided from the original print job is N, where $N \geq 2$, the determining submodule then determines, starting from the Nth job, whether the plurality of distributed print jobs include the predetermined page, wherein the output cancellation issuing module issues, based on the results of the determining submodule, the instruction for canceling outputting after the predetermined page specified by the page specifying module is printed.

7. An information processing apparatus for controlling distributed printing, comprising:

a distributed print job generating unit configured to divide an original print job into a plurality of distributed print jobs;

a display control unit configured to display a setting screen for inputting cancellation of the distributed printing together with a page at which the distributed printing is to be cancelled;

an analyzing unit configured to analyze which distributed print job among the plurality of distributed print jobs already spooled to a device includes a range of pages to be cancelled; and an output cancellation issuing unit configured to, based on results of the analyzing unit, issue an instruction for canceling to a device outputting the distributed print job including the range of pages to be cancelled, wherein the output cancellation issuing unit does not issue an instruction for cancelling to a device for outputting a distributed print job that includes pages not in the range of pages to be cancelled.

8. A method for controlling distributed printing, comprising:

dividing an original print job into a plurality of distributed print jobs;

displaying a setting screen for inputting cancellation of the distributed printing together with a page at which the distributed printing is to be cancelled;

analyzing which distributed print job among the plurality of distributed print jobs already spooled to a device includes a range of pages to be cancelled; and issuing, based on an analyzed result, an instruction for canceling to a device outputting the distributed print job including the range of pages to be cancelled, wherein the instruction for cancelling is not issued to a device for outputting a distributed print job that includes pages not in the range of pages to be cancelled.

9. A computer-readable memory medium embodying a program of instruction executable by a machine for controlling distributed printing, the program comprising:

a distributed print job generating module for dividing an original print job into a plurality of distributed print jobs;

a display control module for displaying a setting screen for inputting cancellation of the distributed printing together with a page at which the distributed printing is to be cancelled.

an analyzing module for analyzing which distributed print job among the plurality of distributed print jobs already spooled to a device includes a range of pages to be cancelled; and an output cancellation issuing module for issuing, based on results of the analyzing module, an instruction for canceling to a device outputting the distributed print job including the range of pages to be cancelled wherein the output cancellation issuing module does not issue an instruction for cancelling to a device outputting a distributed print job that includes a page not in the range of pages to be cancelled.

* * * * *